United States Patent
Koivisto

(10) Patent No.: US 9,853,782 B2
(45) Date of Patent: *Dec. 26, 2017

(54) EFFICIENT SIGNALING OF COMMON REFERENCE SIGNAL SHIFTS AND PHYSICAL DOWNLINK CONTROL CHANNEL REGION MISMATCH IN COORDINATED MULTIPOINT TRANSMISSION

(71) Applicant: AVAGO TECHNOLOGIES GENERAL IP (SINGAPORE) PTE. LTD., Singapore (SG)

(72) Inventor: Tommi Koivisto, Espoo (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 30 days.

This patent is subject to a terminal disclaimer.

(21) Appl. No.: 15/040,709

(22) Filed: Feb. 10, 2016

(65) Prior Publication Data

US 2016/0164649 A1 Jun. 9, 2016

Related U.S. Application Data

(63) Continuation of application No. 13/292,367, filed on Nov. 9, 2011, now Pat. No. 9,270,345.

(30) Foreign Application Priority Data

Nov. 7, 2011 (GB) .................................. 1119190.5

(51) Int. Cl.
- H04L 5/00 (2006.01)
- H04B 7/024 (2017.01)
- H04W 72/04 (2009.01)

(52) U.S. Cl.
CPC ........... *H04L 5/0035* (2013.01); *H04B 7/024* (2013.01); *H04L 5/001* (2013.01); *H04L 5/005* (2013.01);
(Continued)

(58) Field of Classification Search
USPC ........................................ 370/252, 329, 430
See application file for complete search history.

(56) References Cited

U.S. PATENT DOCUMENTS 8,995,400 B2    3/2015  Geirhofer
9,407,409 B2*   8/2016  Bhattad ................. H04L 1/0606
(Continued)

FOREIGN PATENT DOCUMENTS

EP        2381709 A1      10/2011
WO   WO 2010/081166 A2    7/2010
WO   WO 2010/123270 A2   10/2010

OTHER PUBLICATIONS

EP Combined Search and Examination Report under Sections 17 and 18(3) issued for corresponding GB Patent Application No. GB1119190.5, dated Feb. 23, 2012.
(Continued)

*Primary Examiner* — John Pezzlo
(74) *Attorney, Agent, or Firm* — Oblon, McClelland, Maier & Neustadt, L.L.P.

(57) ABSTRACT

Information about a set of cells potentially taking part in coordinated multipoint transmission is obtained, information about at least one of reference signal configuration and data region size configuration for each of the set of cells is obtained, further an indication of which of the reference signals configuration and the data region size configuration should be assumed in resource mapping for data is obtained, and data according to the resource mapping is received. Information about at least one of reference signal configu-
(Continued)

ration and data region size configuration for each cell of a set of cells potentially taking part in coordinated multipoint transmission is provided, and an indication of which of the reference signals configuration and the data region size configuration should be assumed in resource mapping for data is provided.

20 Claims, 4 Drawing Sheets

(52) U.S. Cl.
CPC .......... *H04L 5/0053* (2013.01); *H04L 5/0094* (2013.01); *H04W 72/0413* (2013.01)

(56) References Cited

U.S. PATENT DOCUMENTS

| | | |
|---|---|---|
| 2010/0195599 A1 | 8/2010 | Zhang et al. |
| 2011/0235603 A1 | 9/2011 | Cheng et al. |
| 2012/0281556 A1 | 11/2012 | Sayana et al. |
| 2012/0287799 A1* | 11/2012 | Chen ................... H04B 7/024 370/252 |
| 2013/0039291 A1 | 2/2013 | Blankenship et al. |
| 2013/0044707 A1 | 2/2013 | Chen |
| 2013/0044727 A1 | 2/2013 | Nory et al. |
| 2013/0077513 A1 | 3/2013 | Ng et al. |
| 2013/0077514 A1* | 3/2013 | Dinan .................. H04L 5/0057 370/252 |
| 2013/0083681 A1 | 4/2013 | Ebrahimi Tazeh Mahalleh et al. |

OTHER PUBLICATIONS

3GPP TR 36.814 V9.0.0 (Mar. 2010), Technical Report, 3$^{rd}$ Generation Partnership Project; Technical Specification Group Radio Access Network; Evolved Universal Terrestrial Radio Access (E-UTRA); Further Advancements for E-UTRA Physical Layer Aspects (Release 9), (107 pages).

3GPP TR 36.819 V11.0.0 (Sep. 2011), Technical Report, 3$^{rd}$ Generation Partnership Project' Technical Specification Group Radio Access Network; Coordinated Multi-Point Operation for LTE Physical Layer Aspects (Release 11), (68 pages).

* cited by examiner

Cells #2 and #3 with DPS, optimized

Cell #3 transmitting

Cell #2 transmitting

Cell #1 with CS/CB, optimized

PDCCH
CRS
PDSCH

EFFICIENT SIGNALING OF COMMON REFERENCE SIGNAL SHIFTS AND PHYSICAL DOWNLINK CONTROL CHANNEL REGION MISMATCH IN COORDINATED MULTIPOINT TRANSMISSION

CROSS-REFERENCE TO RELATED APPLICATIONS

This application is a continuation of and claims the benefit of priority under 35 U.S.C. §120 to U.S. application Ser. No. 13/292,367, filed Nov. 9, 2011, which claims benefit under 35 U.S.C. §119(a) and 37 C.F.R. §1.55 to UK Patent Application 1119190.5, filed on Nov. 7, 2011; the entire of contents of which are incorporated herein by reference.

FIELD OF THE INVENTION

The present invention relates to methods, devices and computer program products for efficient signaling of common reference signal shifts and physical downlink control channel region mismatch in coordinated multipoint transmission.

BACKGROUND

The following meanings for the abbreviations used in this specification apply:
CB Coordinated Beamforming
CoMP Coordinated Multipoint
CRS Common Reference Signal
CS Coordinated Scheduling
CSI Channel State Information
DL Downlink
DPS Dynamic Point Selection
eNB Enhanced Node B. Name for Node B in LTE
E-PDCCH Enhanced Physical Downlink Control Channel
FDD Frequency Division Duplex
ID Identity
JT Joint Transmission
LTE Long Term Evolution
LTE-A Long Term Evolution Advanced
MIMO Multiple-Input Multiple-Output
MU Multi User
OFDM Orthogonal Frequency Division Multiplexing
PCFICH Physical Control Format Indicator Channel
PDCCH Physical Downlink Control Channel
PDSCH Physical Downlink Shared Channel
PRB Physical Resource Block
RAN Radio Access Network
RRC Radio Resource Control
RRH Remote Radio Head
SI Study Item
SU Single User
TDD Time Division Duplex
UE User Equipment
UL Uplink
UL-SCH Uplink Synchronization Channel
WI Work Item In the 3rd Generation Partnership Project (3GPP) Long Term Evolution (LTE) and LTE-Advanced (LTE-A), single cell single-user (SU-) and multi-user (MU-) multiple-input multiple-output (MIMO) network performance is interference-limited, especially at the cell edge. Therefore, introduction of the technology of coordinated multipoint (CoMP) transmission/reception has been considered, where in downlink, multiple points co-operate in scheduling and transmission in order to strengthen desired signal and mitigate inter-cell interference. According to the 3GPP technical report on CoMP, TR36.819, a point is a set of geographically co-located transmit antennas and the sectors of the same site correspond to different points. It should be noted that a cell is formed by one or multiple points.

After RAN1#66 meeting the CoMP TR was approved. The agreed CoMP WID proposes the following focus for the CoMP work during Rel-11:

"The work for specifying CoMP support in Rel-11 should focus on
  Joint transmission
  Dynamic point selection, including dynamic point blanking
  Coordinated scheduling/beamforming, including dynamic point blanking"

In joint transmission (JT) CoMP two or more points transmit simultaneously to a CoMP user. Dynamic point selection (DPS) refers to a scheme where the transmission point is switched according to changes in signal strength. In coordinated beamforming/scheduling (CB/CS) the scheduling decisions of neighbor points are coordinated in order to reduce interference. In principle all schemes may include blanking/muting which means that one or more transmission points are blanked/muted to decrease the interference.

The agreed CoMP WI targets specification of intra- and inter-cell DL CoMP schemes operating in homogeneous and heterogeneous configurations. Four main scenarios have been studied so far: intra-site (scenario 1), inter-site with high power RRH (scenario 2), low power RRH within the coverage of the macro cell, without and with the same cell ID (scenarios 3 and 4, respectively). CoMP WI addresses both FDD and TDD, hence unified solutions should be targeted.

In the following, a problem which may occur in these configurations is described in more detail.

For CoMP, UE is configured with a CoMP measurement set which is the set of CSI-RS resources (transmission points, each mapped to one CSI-RS resource) that the UE is supposed to measure for CSI feedback. Additionally, a CoMP reporting set has been defined—this is the set for which the UE is reporting CSI feedback. Typically it is assumed that CoMP measurement set would be equal to the CoMP reporting set, however it may also be that it will be defined that the UE will have to downselect the points for which CSI is to be reported. In this case CoMP reporting set would be a subset of the CoMP measurement set. Finally, a CoMP cooperating set has been defined as the set of points actually transmitting to the UE. Also this set would be typically a subset of CoMP measurement/reporting set. The UE is not aware of the cooperating set as cooperating set is essentially a network implementation issue and full freedom is left for the eNB to decide on which points should be participating the CoMP transmission. The main problem addressed with this invention arises from the fact that the UE is not aware of the transmission points actually transmitting to the UE in a particular time/frequency resource (e.g. PRB pair). Furthermore, in addition to the transmitting points, the actual CoMP scheme might be transparent to the UE, even though the feedback would most likely be optimized for a certain specific scheme (or multiple schemes). CoMP schemes are described at high level in TR 36.814.

In addition to PDSCH transmissions with CoMP, each point will need to be transmitting the cell-specific transmissions relating to its cell ID. These transmissions include:

Physical downlink control channel transmissions (PD-CCH)

Cell-specific reference signal transmissions

PDCCH region size can typically take 1-3 OFDM symbols of the subframe (2-4 symbols in case of 1.4 MHz bandwidth; 0 symbols may become also possible in Release 11 for PDCCH-less (extension) carriers). The PDCCH region size may further vary on a per subframe basis—the length of the PDCCH region is indicated dynamically to the UE via the PCFICH channel. In CoMP, the problem becomes that the PDCCH region may be different in each cell participating in the CoMP transmission, and the UE will not know the PDCCH region size in each cell. It is noted that it is infeasible to assume that the UE would detect the PCFICH from each cell. Hence, UE will not be aware of the PDCCH region size used in each cell participating in the CoMP transmission. Optimally, such knowledge would be needed as follows:

For joint transmission, PDSCH can only be transmitted within the OFDM symbols that are not used in any of the cells for PDCCH.

For dynamic point selection, PDSCH can in principle be transmitted within the OFDM symbols that are not used in the same PRB(s) for PDCCH transmission from the selected point. However, this approach might lead to rather complicated PDSCH resource mapping, hence in practice it would be simplest to assume that PDSCH is mapped only to OFDM symbols in which none of the selected points is transmitting PDCCH.

For coordinated scheduling/beamforming, PDSCH is transmitted only from one point at a time. Hence, PDSCH would be optimally mapped to OFDM symbols not containing PDCCH from serving point.

For single point fallback mode, PDSCH would be mapped according to the serving cell PDCCH region (and CRS shifts, see below).

Since the UE does not know the CoMP scheme, the transmitting points or the PDCCH region size in different cells, in practice the UE would have to be configured with the PDSCH starting position (symbol). Here the problem arises that such an approach will waste a lot of resources as the configuration will have to be done for the worst case; especially when transmitting only from a single point it would be much better in terms of overhead to follow the PDCCH region size of that point in PDSCH resource mapping.

A similar problem arises with common reference signals (CRS). In Release 8, the CRS pattern is shifted in frequency according to the cell ID. There are six different shifts possible, and if two or more Tx antennas are used, essentially three shifts result in non-overlapping CRS (since CRS for 2Tx are multiplexed within the same symbol). Again, since the UE is not aware of either the CoMP scheme or the transmitting points (or participating cells, hence CRS), the overhead will basically have to be accounted for according to the worst case. For example, one might configure the UE to avoid all CRS shifts corresponding to the cell IDs within the configured CoMP measurement set. And again the PDSCH overhead will be significantly increased.

An example configuration is shown in FIG. 5 with three cells (2Tx CRS each) configured in the CoMP measurement set, the cells having different PDCCH region sizes and different CRS shifts. Note that each of the cells may correspond to multiple points and not all of the points under each cell need to be part of the CoMP measurement set. Hence the set of cells here is the set of cells from which at least one point is part of the CoMP measurement set.

According to the worst case configuration, the PDSCH mapping would then be as shown in FIG. 6, i.e. PDCCH region is two OFDM symbols and all CRS shifts are avoided. On the other hand, FIG. 7, FIG. 8 and FIG. 9 illustrate the PDSCH mapping in case of ideal knowledge about CRS shifts and PDCCH region sizes. Furthermore in case of fallback to single point transmission the PDSCH mapping could ideally follow the PDSCH mapping according to the serving cell PDCCH region and CRS shifts.

In detail, FIG. 6 shows the worst case overhead, wherein PDSCH is mapped around CRS shifts and PDCCH of all according to a semi-static configuration only. FIG. 7A shows a case in which cells #1 and #2 are used for joint transmission CoMP with optimized PDSCH mapping configuration, and FIG. 7B shows the case in which cells #2 and #3 are used for joint transmission CoMP with optimized PDSCH mapping configuration.

FIG. 8 illustrates an optimum overhead in case of dynamic point selection. In the first PRB pair, one of cell #3 transmission points is transmitting, and in the second PRB pair, one of cell #2 transmission points is transmitting. FIG. 9 illustrates an optimum overhead with CS/CB where the serving point belongs to cell #1. Note that also fallback to single point transmission would ideally follow a similar PDSCH resource mapping.

So the problem is essentially, how to signal efficiently to the UE as much information as possible about the PDSCH resource mapping in order to optimize resource utilization in CoMP transmissions. It is noted that the problem could be circumvented by forcing operators to deploy CoMP such that PDCCH region as well as CRS shifts are the same in all cells. However, it is not clear how such an artificial restriction could be enforced in practice, or whether it is even feasible to specify something for that purpose such that the UE could in fact assume same shifts and PDCCH region sizes in implementation. From that perspective some signaling will be needed. It is also considered here that dynamic signaling of full information is not feasible due to control information size/overhead restrictions.

The issue has been discussed in 3GPP RAN1. during the LTE-Advanced study item (2008-2009). The basic proposed solutions are:

Semi-static (RRC) signaling of cell IDs for which the UE needs to avoid CRS shifts, and semi-static signaling of PDSCH starting position (symbol). This would correspond to the worst case as discussed in the previous section.

Simple dynamic signaling of which CRS shifts need to be avoided. Dynamic signaling to indicate PDSCH starting position (e.g. 4 options assuming that PDSCH can start from symbols 0 to 4). Such signaling would require quite many bits on PDCCH and therefore is not desirable.

Thus, according to the prior art as described above, necessary configuration etc. for CoMP transmission might lead to an increased overhead regarding the required control signaling.

SUMMARY

The present invention addresses such situation and deals in exemplary embodiments, with control signaling in support of CoMP schemes, in particular in order to avoid increased overhead with joint processing and dynamic point selection schemes due to CRS shifts and PDCCH region mismatches.

Various aspects of examples of the invention are set out in the claims.

According to a first aspect of the present invention, there is provided an apparatus comprising
at least one processor
and at least one memory including computer program code,
the at least one memory and the computer program being configured to, with the at least one processor, cause the apparatus to
obtain information about a set of cells potentially taking part in coordinated multipoint transmission,
obtain information about at least one of reference signal configuration and data region size configuration for each of the set of cells,
further obtain an indication of which of the reference signals configuration and the data region size configuration should be assumed in resource mapping for data, and
receive data according to the resource mapping.

According to a second aspect of the present invention, there is provided an apparatus comprising
at least one processor
and at least one memory including computer program code,
the at least one memory and the computer program being configured to, with the at least one processor, cause the apparatus to perform:
provide information about at least one of reference signal configuration and data region size configuration for each of set of cells potentially taking part in coordinated multipoint transmission, and
provide an indication of which of the reference signals configuration and the data region size configuration should be assumed in resource mapping for data.

According to a third aspect of the present invention, there is provided a method comprising
obtaining information about a set of cells potentially taking part in coordinated multipoint transmission,
obtaining information about at least one of reference signal configuration and data region size configuration for each of the said set of cells,
obtaining an indication of which of the reference signals configuration and the data region size configuration should be assumed in resource mapping for data, and
receiving data according to the resource mapping.

According to a fourth aspect of the present invention, there is provided a method comprising
providing information about at least one of reference signal configuration and data region size configuration for each cell of a set of cells potentially taking part in coordinated multipoint transmission, and
providing an indication of which of the reference signals configuration and the data region size configuration should be assumed in resource mapping for data.

Thus, according to embodiments of the present invention, the UE is provided with an indication which of the reference signals configuration and the data region size configuration should be assumed in resource mapping for data, so that an increased overhead with joint processing and dynamic point selection schemes due to CRS shifts and PDCCH region mismatches can be avoided.

Advantageous further developments are as set out in respective dependent claims thereof.

According to a further aspect of the present invention, there are provided computer program products comprising computer-executable components which, when executed on a computer, are configured to implement the respective methods as set out herein above. The above computer program products may be embodied as a computer-readable storage medium.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the invention will be described herein below.

It is to be noted that the following exemplary description refers to an environment of the LTE system (long term evolution) and/or local area networks thereof. However, it is to be understood that this serves for explanatory purposes only. Other systems differing from the LTE system can be adopted.

As mentioned above, according to certain embodiments of the present invention, a signaling scheme for CRS shifts and PDSCH starting position is proposed.

Figure 1:
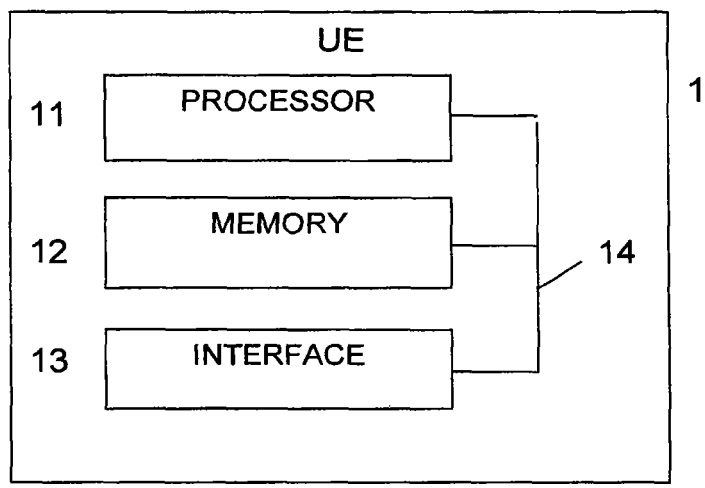
FIG. 1 schematically illustrates a UE according to an embodiment of the present invention.

FIG. 1 illustrates a simplified block diagram of a user equipment (UE) 1 according to an embodiment of the present invention. It is noted that the UE, and the corresponding apparatus according to the embodiment may consist only of parts of the UE, so that the apparatus may be installed in an UE, for example. Moreover, also the UE is only an example and may be replaced by another suitable network element.

The UE 1 according to this embodiment comprises a processor 11 and a memory 12. The memory comprises a computer program, wherein the memory 12 and the computer program are configured to, with the processor, cause the apparatus to perform several operations as described below by referring to FIG. 2. Optionally, the UE 1 may also comprise an interface 13 for providing connections to other network elements. Moreover, the processor 11, the memory 12 and the interface 13 may be inter-connected by a suitable connection 14, e.g., a bus or the like. Moreover, it is noted that the apparatus may comprise more than one processor, more than one memory and/or more than one interface, if this is suitable for a particular structure.

Figure 2:
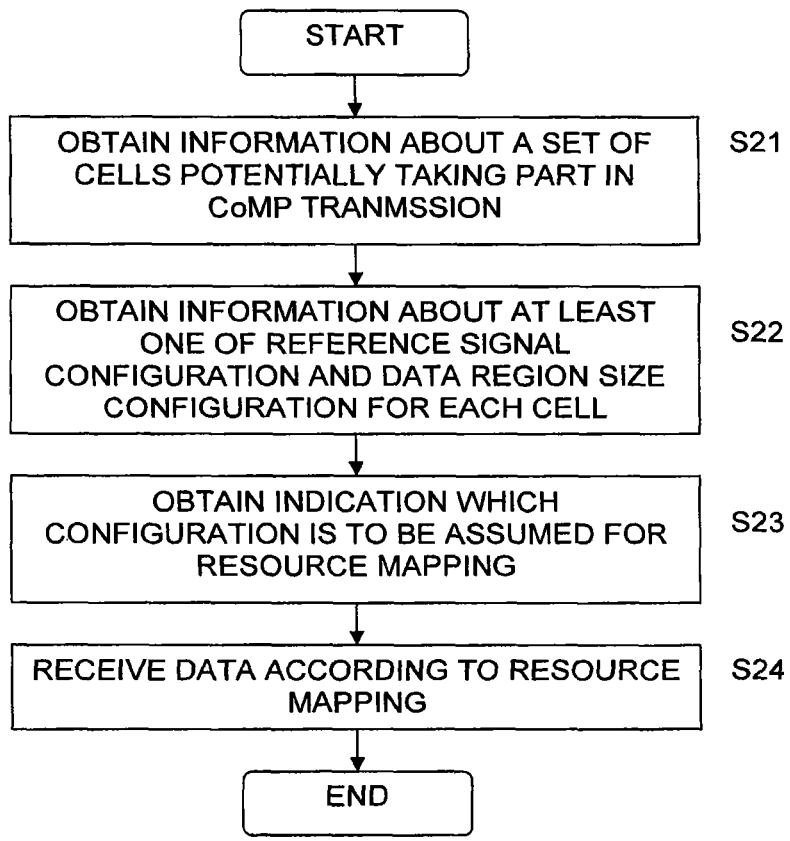
FIG. 2 shows a flow chart of a process performed by the UE according to the embodiment FIG. 3 schematically illustrates an eNB according to an embodiment of the present invention.

FIG. 2 shows a flow chart for describing the basic operations according to the first embodiment, which may be performed by the UE 1 shown in FIG. 1.

In step S21, information about a set of cells potentially taking part in coordinated multipoint transmission is obtained. In step S22, information about at least one of reference signal configuration and data region size configuration for each of the set of cells is obtained. Furthermore, in step S23, an indication of which of the reference signals configuration and the data region size configuration should be assumed in resource mapping for data is obtained. In step S24, data is received according to the resource mapping.

Thus, by receiving the above-described indication, the UE can easily know which resource mapping is to be applied for data reception.

Figure 3:
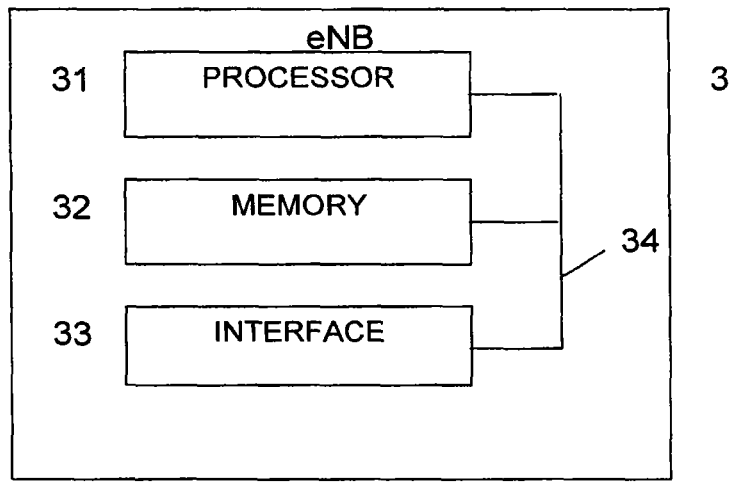

FIG. 3 shows an eNB 3 as an example for an apparatus which carries out the CoMP configuration. The eNB 3 according to this embodiment comprises a processor 31 and a memory 32. The memory comprises a computer program, wherein the memory 32 and the computer program are configured to, with the processor, cause the apparatus to perform several operations as described below by referring to FIG. 4. Optionally, similar as in case of the UE 1 shown in FIG. 1, the eNB 3 may also comprise an interface 33 for providing connections to other network elements. Moreover, the processor 31, the memory 32 and the interface 33 may be inter-connected by a suitable connection 34, e.g., a bus or the like. Moreover, it is noted that the apparatus may comprise more than one processor, more than one memory and/or more than one interface, if this is suitable for a particular structure.

Figure 4:
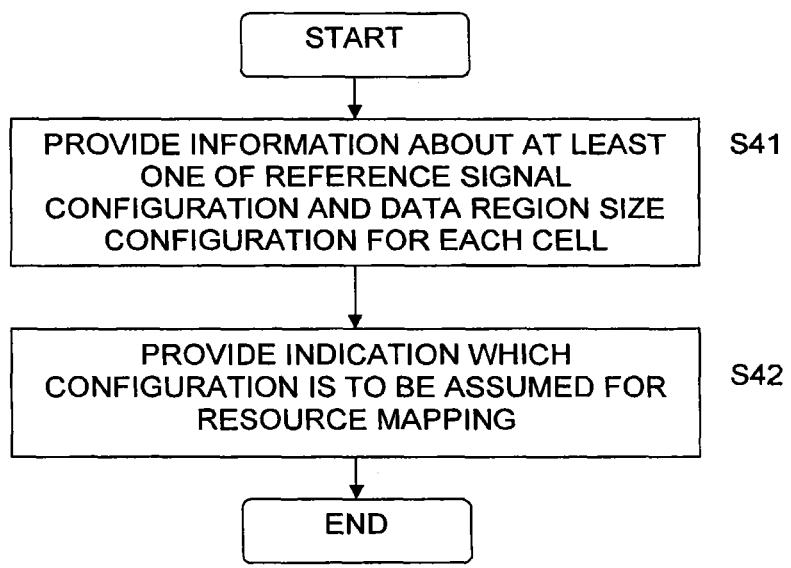
FIG. 4 shows a flow chart of a process performed by the eNB according to the first embodiment.
Figure 5:
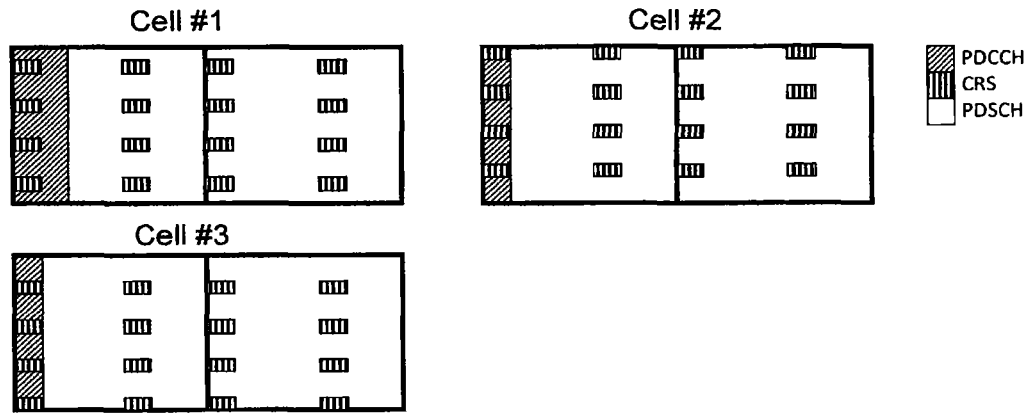
FIG. 5 shows an examples of CRS shifts and PDCCH/PDSCH regions of three cells configured as a CoMP measurement set.
Figure 6:
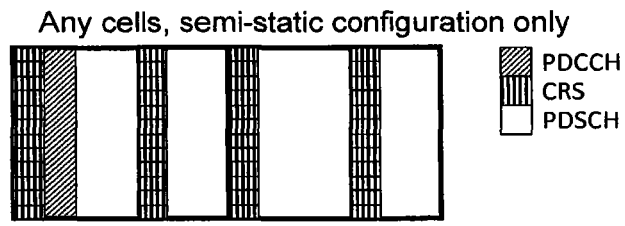
FIG. 6 shows a worst case overhead.
Figure 7:
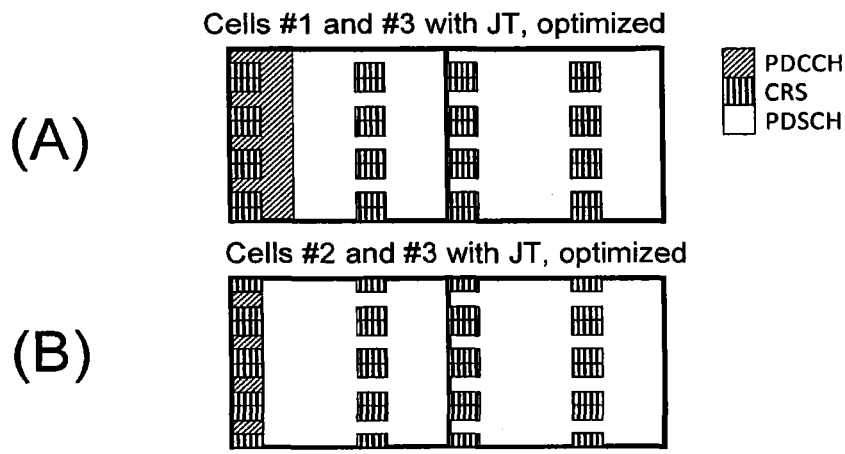
FIGS. 7(A) and 7(B) show optimum overhead in case of joint transmission CoMP.
Figure 8:
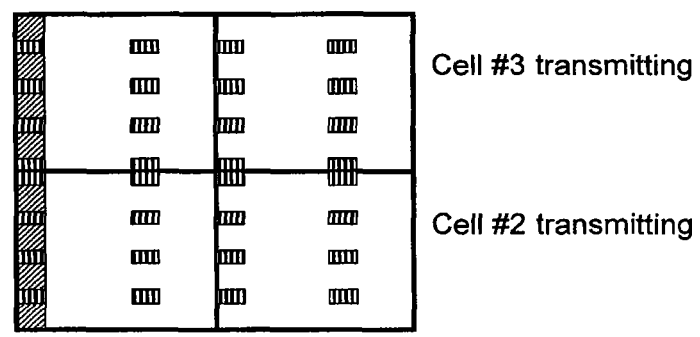
FIG. 8 shows optimum overhead in case of dynamic point selection.
Figure 9:
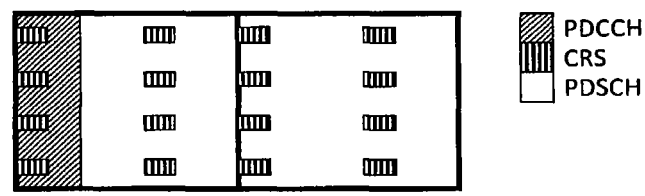
FIG. 9 shows optimum overhead with CS/CB.

FIG. 4 shows a flow chart for describing the basic operations according to the first embodiment for the configuration, which may be performed by the eNB 3 shown in FIG. 3.

In step S41, information about at least one of reference signal configuration and data region size configuration for each of set of cells potentially taking part in coordinated multipoint transmission is provided, for example to the UE 1 shown in FIG. 1. Moreover, in step S42, an indication of which of the reference signals configuration and the data region size configuration should be assumed in resource mapping for data is provided, for example to the UE 1 shown in FIG. 1.

In this way, the eNB can easily inform the UE about the resource mapping which should be applied when the UE receives data.

The processes according to the embodiments described above are described in the following in more detail by referring to specific examples.

According to a certain embodiment, the scheme relies on following side information that the UE has available:
  PCFICH information of the serving cell. UE always detects PCFICH for the serving cell. Note that it may be transmitted jointly from one or multiple transmission points of the same cell.
  PDSCH starting position as configured for the other cells containing at least one point in the CoMP measurement set. It is noted that such information is already configured per cell in Release 10 carrier aggregation and it may be natural to reuse the signaling such that this would be cell-specific information (signaled with UE-specific signaling).
  In certain type of CoMP feedback schemes the UE indicates which CSI-RS resources (points) would be recommended to be participating to the transmission. Also during 3GPP discussions it has been proposed that the UE would signal e.g. the index of the best transmission point (CSI-RS resource). In such case the UE would know which points have been recommended to be transmitting.
  Finally for correct assumption about CRS, the UE could make use of number of CRS ports for each cell ID involved in the CoMP measurement set. Hence, preferably this is also signaled to the UE.

With this information, following signaling is proposed:

An indication can be provided that only points from the serving cell are participating in the CoMP transmission. This indication would be beneficial for single-point fallback as well as for scenarios as the so called CoMP scenario 4 wherein the points in the CoMP measurement set may be having the same cell ID. In this case the UE will know both the PDCCH region size as well as the CRS shift, hence PDSCH resource mapping can be fully optimized. Such an indication is needed anyway in the likely case that MIMO and CoMP will be seamlessly working within the same transmission mode.

Alternatively, an indication can be provided that the latest UE recommendation of the transmitting points is followed by the eNB. Hence, the UE will know the applied CRS shifts, since cell ID is signaled together with each CSI-RS resource (i.e. for each point the UE knows the related cell ID). The UE can also derive optimum PDSCH starting position based on knowledge of signaled PDSCH starting position for neighboring cells and PDCCH region size for the serving cell.

If none of the above cases is indicated to the UE, the UE will follow the worst case configuration as given by the eNB during CoMP measurement set configuration signaling.

The above indications are example for the indication of which of the reference signals configuration and the data region size configuration should be assumed in resource mapping for data as described above in connection with FIGS. 2 and 4.

The signaling according to the embodiment would be included in the PDCCH signaling, i.e. the DL grant used to schedule CoMP transmissions. A few alternatives can be envisioned there:
  One bit per indication, for example one for indicating serving cell—only transmission and one for indicating that the latest UE CSI feedback report if followed.
  Further alternatively, a joint signaling with a 2-bit field thus containing 4 states could be used:
    1 state indicating serving cell-only transmission,
    1 state indicating that UE recommendation of transmitting points is followed. This would be linked to the latest CSI feedback report transmitted on PUSCH as that is CRC-protected (likely not linked to PUCCH as there is no error protection which is needed for such confirmation bits),
    1 state can be used for some other pre-defined combination of CRS shift and PDSCH starting position. The meaning of this state could be for example RRC-configured.
    1 state indicating that UE should follow the (worst case) configuration (default configuration) given by the CoMP measurement set configuration.

It is noted that signaling may also be such that not all above states are included. For example, only one bit with a subset of the states could be used, in which either the indication of the serving cell-only transmission or the default configuration is indicated, or the indication that the UE recommendation is followed or the default configuration is indicated.

UE procedure according to the present embodiment is as follows:

The UE receives from the eNB multiple non-zero-power CSI-RS configurations, each mapped to a cell ID, in other words the CoMP measurement set (as an example for step S21 shown in FIG. 2). For each non-zero-power CSI-RS configuration, the UE also receives corresponding PDSCH starting position that is to be assumed (as an example for step S22 shown in FIG. 2). Similarly the UE may also receive information about the number of CRS ports linked to each cell ID within the CoMP measurement set.

The UE reports CSI feedback for CoMP purposes. This feedback is assumed to contain an indication of the recommended transmitting points.

The UE may detect PCFICH to get the PDCCH region size in the serving cell (as an example for step S22 in FIG. 2).

Alternatively it may be that UE is signaled also the PDSCH starting position for the CSI-RS resource corresponding to the serving cell (e.g. to avoid having to detect PCFICH when configured to use the new E-PDCCH channel for control).

UE receives the downlink grant containing the proposed control information field (as an example for step S23 in FIG. 2).

If serving cell-only transmission is indicated, UE decodes PDSCH assuming rate matching according to the serving cell PDSCH starting position and CRS shifts.

If the signaling indicates that the UE recommendation of transmitting points is followed, the UE will determine the rate matching pattern according to signaled PDSCH starting positions and cell IDs.

If the signaling indicates that UE should follow CoMP measurement set configuration, the UE will assume PDSCH rate matching around all cell IDs in CoMP measurement set configuration, and according to the highest PDSCH starting symbol index.

The corresponding procedure at the eNB side is as follows:

The eNB configures the UE with multiple non-zero-power CSI-RS configurations, each mapped to a cell ID. The eNB also configures the UE with PDSCH starting positions corresponding to each non-zero-power CSI-RS resource (as an example for step S41 in FIG. 4).

The eNB receives CSI feedback report from the UE and decodes the indication of recommended transmission points.

The eNB determines transmitting points to the UE and transmits the DL grant (as an example for step S42 in FIG. 4).

Also the PCFICH should be transmitted.

If the eNB uses single-cell transmission (from single or multiple points), the DL grant indicates this. When transmitting PDSCH, the eNB will rate match PDSCH around CRS and PDCCH of the serving cell.

If the selected transmission points correspond to what UE recommended in the CSI feedback report, the DL grant indicates this. When transmitting PDSCH, the eNB will rate match the PDSCH around the corresponding CRS shifts and use correct PDSCH starting symbol accordingly.

Similarly for the other cases the eNB determines the signaling indication and the corresponding PDSCH rate matching pattern.

In this way, a very low overhead signaling allowing for PDSCH overhead savings most of the time can be achieved (in typical cases where the eNB either follows UE recommendation on scheduling or falls back to single point transmission).

It is noted that the invention is not limited to the specific embodiments as described above.

Embodiments of the present invention may be implemented in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to environments under LTE, WCDMA, WIMAX and WLAN and can advantageously be implemented in user equipments or smart phones, or personal computers connectable to such networks. That is, it can be implemented as/in chipsets to connected devices, and/or modems or other modules thereof.

If desired, at least some of the different functions discussed herein may be performed in a different order and/or concurrently with each other. Furthermore, if desired, one or more of the above-described functions may be optional or may be combined.

[Note: in the final version, here the features of the dependent claims as well as alternative versions for the independent claims (US claims) will be included]

According to a first aspect of certain embodiments of the present invention, an apparatus is provided which comprises at least one processor and at least one memory including computer program code, the at least one memory and the computer program being configured to, with the at least one processor, cause the apparatus to obtain information about a set of cells potentially taking part in coordinated multipoint transmission, obtain information about at least one of reference signal configuration and data region size configuration for each of the set of cells, further obtain an indication of which of the reference signals configuration and the data region size configuration should be assumed in resource mapping for data, and receive data according to the resource mapping.

The first aspect may be modified as follows:

The at least one memory and the computer program may be configured to, with the at least one processor, cause the apparatus to obtain the information about the data region size configuration by detecting physical control format indication, or by receiving physical downlink shared channel starting position information.

The at least one memory and the computer program may be configured to, with the at least one processor, cause the apparatus to generate feedback including a recommendation of transmitting points, wherein the indication of which of the reference signals configuration and the data region size configuration should be assumed in resource mapping for data comprises a confirmation that the recommended points are transmitting.

The indication of which of the reference signals configuration and the data region size configuration should be assumed in resource mapping for data may comprise information that only points corresponding to the serving cell are transmitting.

The at least one memory and the computer program may be configured to, with the at least one processor, cause the apparatus to perform receiving of the data according to the resource mapping by performing rate matching around reference signals and a physical downlink control channel region indicated by the indication of which of the reference signals configuration and the data region size configuration should be assumed in resource mapping for data.

According to a second aspect of certain embodiments of the present invention, an apparatus is provided which comprises at least one processor and at least one memory including computer program code, the at least one memory and the computer program being configured to, with the at least one processor, cause the apparatus to perform:

provide information about at least one of reference signal configuration and data region size configuration for each of set of cells potentially taking part in coordinated multipoint transmission, and provide an indication of which of the reference signals configuration and the data region size configuration should be assumed in resource mapping for data.

The second aspect may be modified as follows:

The at least one memory and the computer program may be configured to, with the at least one processor, cause the apparatus to, for providing information about the data region size configuration, provide physical control format indication, or provide physical downlink shared channel starting position information.

The at least one memory and the computer program may be configured to, with the at least one processor, cause the apparatus to receive feedback including a recommendation of transmitting points, and to include in the indication of which of the reference signals configuration and the data region size configuration should be assumed in resource mapping for data a confirmation that the recommended points are transmitting.

The at least one memory and the computer program may be configured to, with the at least one processor, cause the apparatus to include information that only points corresponding to the serving cell are transmitting in the indication of which of the said reference signals configuration and data region size configuration should be assumed in resource mapping for data.

According to a third aspect of certain embodiments of the present invention, a method is provided which comprises obtaining information about a set of cells potentially taking part in coordinated multipoint transmission, obtaining information about at least one of reference signal configuration and data region size configuration for each of the said set of cells, obtaining an indication of which of the reference signals configuration and the data region size configuration should be assumed in resource mapping for data, and receiving data according to the resource mapping.

The third aspect may be modified as follows:

The obtaining of the information about the data region size configuration may comprise one of detecting physical control format indication, and receiving a physical downlink shared channel starting position information.

The method may further comprise generating feedback including a recommendation of transmitting points, wherein the indication of which of the reference signals configuration and the data region size configuration should be assumed in resource mapping for data comprises a confirmation that the recommended points are transmitting.

The indication of which of the reference signals configuration and the data region size configuration should be assumed in resource mapping for data may comprise information that only points corresponding to the serving cell are transmitting.

The receiving of the data according to the resource mapping may comprise rate matching around reference signals and a physical downlink control channel region indicated by the indication of which of the reference signals configuration and the data region size configuration should be assumed in resource mapping for data.

According to a fourth aspect of certain embodiments of the present invention, a method is provided which comprises providing information about at least one of reference signal configuration and data region size configuration for each cell of a set of cells potentially taking part in coordinated multipoint transmission, and providing an indication of which of the reference signals configuration and the data region size configuration should be assumed in resource mapping for data.

The fourth aspect may be modified as follows:

The providing information about the data region size configuration may comprise one of providing physical control format indication and providing physical downlink shared channel starting position information.

The method may further comprise receiving feedback including a recommendation of transmitting points, and including in the indication of which of the reference signals configuration and the data region size configuration should be assumed in resource mapping for data a confirmation that the recommended points are transmitting.

The method may further comprise including information that only points corresponding to the serving cell are transmitting in the indication of which of the said reference signals configuration and data region size configuration should be assumed in resource mapping for data.

According to a fifth aspect of certain embodiments of the present invention, a computer program product comprising computer-executable components is provided which, when executed on a computer, are configured to carry out the method as defined in the above third aspect and its variations.

According to a sixth aspect of certain embodiments of the present invention, a computer program product comprising computer-executable components is provided which, when executed on a computer, are configured to carry out the method as defined in the above fourth aspect and its variations.

According to a seventh aspect of certain embodiments of the present invention, an apparatus is provided which comprises means for obtaining information about a set of cells potentially taking part in coordinated multipoint transmission, means for obtaining information about at least one of reference signal configuration and data region size configuration for each of the said set of cells, means for obtaining an indication of which of the reference signals configuration and the data region size configuration should be assumed in resource mapping for data, and means for receiving data according to the resource mapping.

The seventh aspect may be modified as follows:

The apparatus may further comprise means for obtaining the information about the data region size configuration by detecting physical control format indication, or by receiving physical downlink shared channel starting position information.

The apparatus may further comprise means for generating feedback including a recommendation of transmitting points, wherein the indication of which of the reference signals configuration and the data region size configuration should be assumed in resource mapping for data comprises a confirmation that the recommended points are transmitting.

The apparatus may further comprise means for performing receiving of the data according to the resource mapping by performing rate matching around reference signals and a physical downlink control channel region indicated by the indication of which of the reference signals configuration and the data region size configuration should be assumed in resource mapping for data.

Further variations may be similar as according to the first aspect.

According to an eighth aspect of certain embodiments of the present invention, a method is provided which comprises means for providing information about at least one of reference signal configuration and data region size configuration for each cell of a set of cells potentially taking part in coordinated multipoint transmission, and means for providing an indication of which of the reference signals configuration and the data region size configuration should be assumed in resource mapping for data.

The eighth aspect may be modified as follows:

The apparatus may further comprise means for providing physical control format indication or providing physical downlink shared channel starting position information.

The apparatus may further comprise means for receiving feedback including a recommendation of transmitting points, and means for including in the indication of which of the reference signals configuration and the data region size configuration should be assumed in resource mapping for data a confirmation that the recommended points are transmitting.

The apparatus may further comprise means for including information that only points corresponding to the serving cell are transmitting in the indication of which of the said reference signals configuration and data region size configuration should be assumed in resource mapping for data.

Further variations may be similar as according to the second aspect.

It is to be understood that any of the above modifications can be applied singly or in combination to the respective aspects and/or embodiments to which they refer, unless they are explicitly stated as excluding alternatives.

In particular, it is noted that according to all aspects described above, the reference signal configuration may further comprise at least one of number of reference signal ports and frequency shift.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
circuitry configured to
obtain information about a set of cells potentially taking part in coordinated multipoint transmission;
obtain information about a reference signal configuration for each cell of the set of cells;
generate and transmit feedback including channel state information corresponding to the set of cells;
obtain an indication of which cells of the set of cells are selected to take part in the coordinated multipoint transmission in response to the feedback, wherein the indication indicates at least a first state indicating serving cell-only transmission, a second state indicating that a subset of the set of cells are selected to take part in the coordinated multipoint transmission, or a third state indicating a configuration different from the first state and the second state; and
receive data according to the state indicated by the indication of which cells of the set of cells are selected to take part in the coordinated multipoint transmission.

2. The apparatus of claim 1, wherein
the reference signal configuration comprises a number of reference signal ports.

3. The apparatus of claim 1, wherein
the reference signal configuration comprises a frequency shift.

4. The apparatus of claim 1, wherein
the indication includes an indication of which reference signal configuration should be assumed in resource mapping for data in response to the feedback.

5. The apparatus of claim 4, wherein
the indication of which reference signal configuration should be assumed in resource mapping for data indicates the second state.

6. The apparatus of claim 4, wherein
the indication of which reference signal configuration should be assumed in resource mapping for data indicates the first state.

7. The apparatus of claim 4, wherein
the circuitry is to receive the data of the resource mapping by performing rate matching around reference signals indicated by the indication of which reference signal configuration should be assumed in resource mapping for data.

8. The apparatus of claim 1, wherein
the reference signal configurations are different for at least two cells of the set of cells.

9. The apparatus of claim 1, wherein
the apparatus is a user equipment.

10. The apparatus of claim 1, wherein
the feedback includes a recommendation of one or more transmitting points selected from among the set of cells.

11. The apparatus of claim 10, wherein
the second state indicates that the recommendation of the one or more transmitting points selected from among the set of cells is followed.

12. An apparatus comprising:
circuitry configured to
provide information about a reference signal configuration for each cell of a set of cells potentially taking part in coordinated multipoint transmission;

receive feedback including channel state information corresponding to the set of cells; and provide an indication of which cells of the set of cells are selected to take part in the coordinated multipoint transmission in response to the feedback, wherein the indication indicates at least a first state indicating serving cell-only transmission, a second state indicating that a subset of the set of cells are selected to take part in the coordinated multipoint transmission, or a third state indicating a configuration different from the first state and the second state.

13. The apparatus of claim 12, wherein
the reference signal configuration comprises at least one of a number of reference signal ports and a frequency shift.

14. The apparatus of claim 12, wherein
the reference signal configurations are different for at least two cells of the set of cells.

15. The apparatus of claim 12, wherein
the apparatus is an enhanced NodeB (eNB).

16. The apparatus of claim 12, wherein
the feedback information includes a recommendation of one or more transmitting points selected from among the set of cells.

17. The apparatus of claim 16, wherein
the second state indicates that the recommendation of the one or more transmitting points selected from among the set of cells is followed.

18. The apparatus of claim 12, wherein
the indication includes an indication of which reference signal configuration should be assumed in resource mapping for data in response to the feedback.

19. A method comprising:
obtaining information about a set of cells potentially taking part in coordinated multipoint transmission;

obtaining information about a reference signal configuration for each cell of the set of cells;

generating and transmitting feedback including channel state information corresponding to the set of cells;

obtaining an indication of which cells of the set of cells are selected to take part in the coordinated multipoint transmission in response to the feedback, wherein the indication indicates at least a first state indicating serving cell-only transmission, a second state indicating that a subset of the set of cells are selected to take part in the coordinated multipoint transmission, or a third state indicating a configuration different from the first state and the second state; and receive data according to the state indicated by the indication of which cells of the set of cells are selected to take part in the coordinated multipoint transmission.

20. The method of claim 19, wherein
the feedback includes a recommendation of one or more transmitting points selected from among the set of cells, and the second state indicates that the recommendation of the one or more transmitting points selected from among the set of cells is followed.

* * * * *